United States Patent [19]
Schwind

[11] Patent Number: 4,730,857
[45] Date of Patent: Mar. 15, 1988

[54] CYLINDRICAL THREADED CONNECTION WITH UNIFORM INTERFERENCE

[75] Inventor: Brian E. Schwind, Houston, Tex.
[73] Assignee: The Hydrill Company, Houston, Tex.
[21] Appl. No.: 775,826
[22] Filed: Sep. 13, 1985
[51] Int. Cl.⁴ ............................................. F16L 15/00
[52] U.S. Cl. .................................... 285/390; 403/343
[58] Field of Search .............. 285/333, 334, 355, 390, 285/92; 403/343

[56] References Cited

U.S. PATENT DOCUMENTS

| | | | |
|---|---|---|---|
| 105,290 | 7/1870 | Allison | 285/334 |
| 1,927,656 | 9/1933 | Eaton et al. | 285/334 X |
| 2,267,923 | 12/1941 | Johnson | 285/334 |
| 2,885,225 | 5/1959 | Rollins | 285/334 X |
| 4,244,607 | 1/1981 | Blose | 285/334 X |
| 4,588,213 | 5/1986 | Bollfrass et al. | 285/333 X |

Primary Examiner—Dave W. Arola
Attorney, Agent, or Firm—Vaden, Eickenroht, Thompson & Boulware

[57] ABSTRACT

A cylindrical threaded connection in which most of the threads between the slightly tapered pin end and the slightly tapered box end have free running radial clearance therebetween. One or two revolutions of thread near the pin end or near the box opening have reduced root dimension or enlarged crest dimension to provide uniform interference in the last revolutions or so of complete connection makeup. This uniformly spreads the load over the axial distance of the interference.

12 Claims, 3 Drawing Figures

CYLINDRICAL THREADED CONNECTION WITH UNIFORM INTERFERENCE

BACKGROUND OF THE INVENTION

1. Field of the Invention

This invention pertains to cylindrical threaded connections and particularly to such connections employed on tubular goods used in the oil and gas industry.

2. Description of the Prior Art

Tubular goods generally comprise a plurality of individual joints each having a pin end and a box end. A connection comprises the pin end of one joint made up with the box end of the adjoining joint. Such ends can either be tapered or substantially cylindrical in configuration. For those connections that are cylindrical, the cylindrical ends are considered to have a nominal radial dimension that remains constant from one revolution to the next at corresponding parts of the thread (e.g., root dimension, crest dimension).

Cylindrical ends are rarely ever truly cylindrical. Often threads are made by milling the external threads on the pin end and the internal threads on the box end. Certain milling inherently produces a slight taper to both the pin end and the box end such that the smallest radial dimension of the pin end is in the first thread revolution and the largest radial dimension of the box end is in the first thread revolution.

It is also common for the threads on both the pin end and the box end to include two thread sets separated by a step so that the thread set on the pin end nearest its tip is at a reduced radial dimension with respect to the other and larger dimension thread set. Correspondingly, the thread set of the box end closest to the open end is at a larger radial dimension than the second thread set located deeper within the opening of the box end.

Cylindrical threaded connections are conventionally made to be free running through the majority of revolutions of their engagement. That is, there is radial clearance between the crest of the threads on the pin end and the root of the threads on the box end. Hence, there is no friction of the crest-and-root of the threads as the first several revolutions are made. Because of the slight taper previously mentioned introduced by the milling process, as the threads approach near complete makeup the radial clearance could reduce to the point of interference for the last few threads only so that more and more torque has to be applied until complete makeup is achieved.

The metal-to-metal seal or shoulder contact is achieved in the cylindrical connection just described in one or more of three surfaces: in the metal area toward the tip from the lead thread on the pin end, in the step area between the thread sets, and in the area behind the last thread on the pin end. The step area between the thread sets is a torque stop shoulder and does not provide a seal, as do the other locations. Engagement is generally only on the initial assembly. Because of permanent distortion caused by the initial assembly of parts, on subsequent assemblies the effect of contact in this region is not great. In the prior art connection just described, there is a danger of galling one or more of these surfaces as the connection is tightened in the final revolution or so of makeup as the sharp line of merging tapered surfaces are forced together.

It may also be apparent that the milling of the threads does not affect the flat seal areas; therefore, the milling taper introduced at the threads may not be introduced at the seal areas, which ideally are maintained at a similar degree of taper.

U.S. Pat. No. 4,244,607 describes a connection in which the pin end intentionally is provided with a small amount of taper with respect to the box end member. That is, there is more taper to the pin end than to the box end. Therefore, the threads are free running until the last few threads engage. The torque becomes greater and greater until makeup is completed. Such a structure merely exaggerates the standard product, possibly also introducing some contact at the load flank of the thread in addition to gradually eliminating the free-running radial clearance. Galling is not minimized with respect to the standard thread design. The loading of threads is not evenly distributed, but is primarily on the threads making the heaviest contact (i.e., having the greatest breakband effect).

Therefore, it is a feature of the present invention to provide an improved cylindrical threaded connection which is free running except for the introduction of interference in the area of the last revolution or two before complete connection makeup without the shortcomings present in the connection described in U.S. Pat. No. 4,244,607.

It is still another feature of the present invention to provide an improved cylindrical threaded connection having a more controlled interference, heavy torque area of contact than connections in the prior art.

It is another feature of the present invention to provide an improved cylindrical threaded connection which provides an evenly distributed torqued area than connections in the prior art.

It is still another feature of the present invention to provide an improved cylindrical threaded connection which provides an enlarged amount of even distributed torqued area which permits the advantages of an evenly made connection even if there are some scarring in part of such area.

It should be further noted that the present invention provides the further advantage of permitting joints invention-enhanced with connector ends to be interchanged or intermingled with joints without the features described herein. For connections having a pin end or box end having threads enhanced in accordance with the present invention, the connection is improved in accordance herewith, even when the mating end does not include the enhancement.

SUMMARY OF THE INVENTION

The pin end of a cylindrical threaded connection comprises a small diameter thread set starting at a location behind the front seal area, a step to a larger diameter intermediate seal area between the thread sets, and a large diameter thread set starting behind the intermediate seal area and terminating in front of the rear seal area. One or two of the leading thread revolutions of the small diameter thread set on the pin end includes a thread having a reduced root portion (radial dimension larger than normal) or an enlarged crest portion (radial dimension larger than normal) or both. Alternatively, or in addition, the corresponding mating thread revolution of the box end has a reduced root portion (radial dimension less than normal) an enlarged crest portion (radial dimension less than normal).

Further alternatively, or in addition, one or two of the ending thread revolutions of the large diameter thread set includes a thread having a reduced root portion or an enlarged crest portion or both. Still further alternatively, or in addition, the corresponding mating thread revolutions of one or both of the thread sets of the box end has a reduced root portion or an enlarged crest portion corresponding to the pin end root and crest configuration described above.

With such a structure, the threads are free-running until the interference is encountered. Then during the last revolution or so of rotation, the expansion of the box end and the shrinking of the pin end occurs relatively uniformly over the area of increased interference.

BRIEF DESCRIPTION OF THE DRAWINGS

So that the manner in which the above-recited features, advantages and objects of the invention, as well as other which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only a preferred embodiment of the invention and are therefore not to be considered limiting of its scope, for the invention may admit to other equally effective embodiments.

In the Drawings.

DESCRIPTION OF THE PREFERRED EMBODIMENTS

Figure 1:
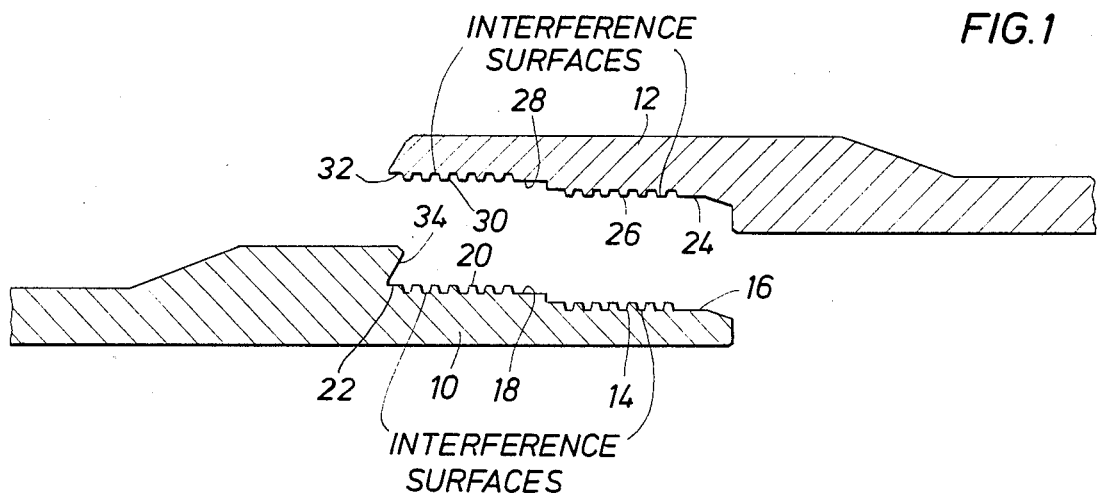
FIG. 1 is a partial side view, in section, of a pin end and a box end of a connection made in accordance with the present invention prior to makeup.

Now referring to the drawings and first to FIG. 1, a partial side view, in section, of a pin end 10 of the inventive connection is shown opposite corresponding box end 12. The pin end has a leading or forward smaller diameter thread set 14 starting at a location behind front or forward seal area 16. The rear of thread set 14 is adjacent intermediate shoulder area 18, which has an enlarged radial dimension from thread set 14 and provides a step up to second thread set 20. Thread set 20 is at an enlarged diameter with respect to first thread set 14 and is located between intermediate shoulder area 18 and rear seal/shoulder area 34.

In similar fashion, the open end of box end 12 includes seal area 24 at its deepest location, which seal area operates together with seal area 16 on pin end 10. Located adjacent seal area 24 is thread set 26, which mates with seal area 14 of pin end 10.

Intermediate shoulder area 28 is located forward or outside of thread set 26 and mates with shoulder area 18. Area 28 also forms a step to the second thread set 30 of box end 12, which thread set matingly corresponds with thread set 20 of the pin end. The last thread, or thread extension 22, of thread set 20 contacts the first thread 32 of thread set 30 when the connection is made up. However, these surfaces are not relied upon for effecting a seal.

It should be noted that the seal areas are possible seal areas for making metal-to-metal contact in a typical cylindrical connection shown; however, in a particular connection a seal may not be present at one or more of these areas.

Thread sets 14 and 20 of the pin end are typically formed from respective unthreaded surfaces of an outside diameter slightly in radial excess of the crest dimension. As the milling occurs, a slight tapering of each thread set 14 and 20 occurs, the tapering in the drawing being gradually radially larger from right to left or from the tip of the pin end toward stop shoulder 34 located adjacent seal area 22.

In similar fashion, the internal threads of box end 12 are also formed by a milling process. In similar fashion, a tapering of the threads occurs from a purely or regular cylindrical dimension so that the radial dimension becomes slightly less the deeper the threads are cut into the box opening, or from left to right in the drawing.

It should be noted that the threads are designed first for free-running. That is, there is radial clearance between the crest dimension of the threads and the corresponding root dimensions of the threads as the pin is rotated with respect to the box end. However, at one or both of the leading two threads of thread set 14 a crest dimension is allowed to be somewhat larger than the remaining crest dimensions. Alternatively, the root dimension in one of the last two revolutions of threads of thread set 14 is allowed to be a little bit more shallow. That is, the radial dimension is a little larger than normal. This means that with all other thread dimensions being standard as described above, when pin end 10 is rotated with respect to box end 12 during makeup the threads are free-running until the last one or two revolutions of thread set 14 coming in contact with the last or deepest corresponding revolutions of box thread set 26. Then, interference occurs at the positions identified as interference surfaces in FIGS. 1 and in 2, which shows the connection completely made up.

Alternatively, or in combination with modifying the crest and/or root dimension of the last one or two revolutions of the thread set 14, it is also possible to correspondingly change the dimensions of the deepest one or two revolutions of thread set 26 in box end 12. In order to change the threads in box end 12, the root would have to be made more shallow, thereby reducing the radial dimension at that point from standard, and/or the crest dimension would have to be made slightly larger, thereby also reducing the radial dimension of the corresponding thread at the crest with respect to standard.

As it will be explained, the beneficial results of such an introduction of interference are several fold. However, to make a connection even more beneficial, it is also possible to enhance the interference of the last one or two revolutions of pin end thread set 20 in similar fashion and/or the first one or two revolutions of thread set 30 of box end 12, which are adjacent the opening. That is, the corresponding root dimensions can be made more shallow than standard and the corresponding crest dimensions can be made larger than standard.

Because of the taper which exists in the overall thread sets, as previously described, the rotation of the reduced root dimensions and/or the enlarged crest dimensions do not interfere with the free-running configuration of the threads until the last one or two revolutions of the connection occurs. At this point torque is increased. Unlike the prior art which has merging tapers, such as shown in U.S. Pat. No. 4,244,607, the increase occurs with respect to a uniform surface and therefore, expansion of the box end and shrinking of the pin end occurs over a greater axial distance than in such prior art.

Further, areas 16, 18, 22, 24, 28 and 32, which are not tapered during milling of the threads, are loaded not by the merging of tapered surfaces, but uniformly as torquing occurs to make the connection complete.

It should be noted that the increase in thread root-to-crest metal-to-metal area in contact means that the torque required to back off the connection is more and must be applied for a fuller back off rotation than with the prior art. It is also noted that with the prior art, tapering of the interference area is somewhat uncertain in location compared to establishing an interference using the controlled root-and-crest change dimensions in accordance with the above description. Since the mating surfaces come in contact substantially all at once (although there is provided a small rotational ramp affect at the initiation of interference), the thread engagement and the seal surface engagements are both at non-tapered zero degrees, which has a distinct advantage with respect to the prior art structures that do not achieve such a zero degree seal.

It may be also noted that the contact does not begin with the scrapping of a edge of metal with respect to a surface, thereby inviting galling to occur.

Figure 3:
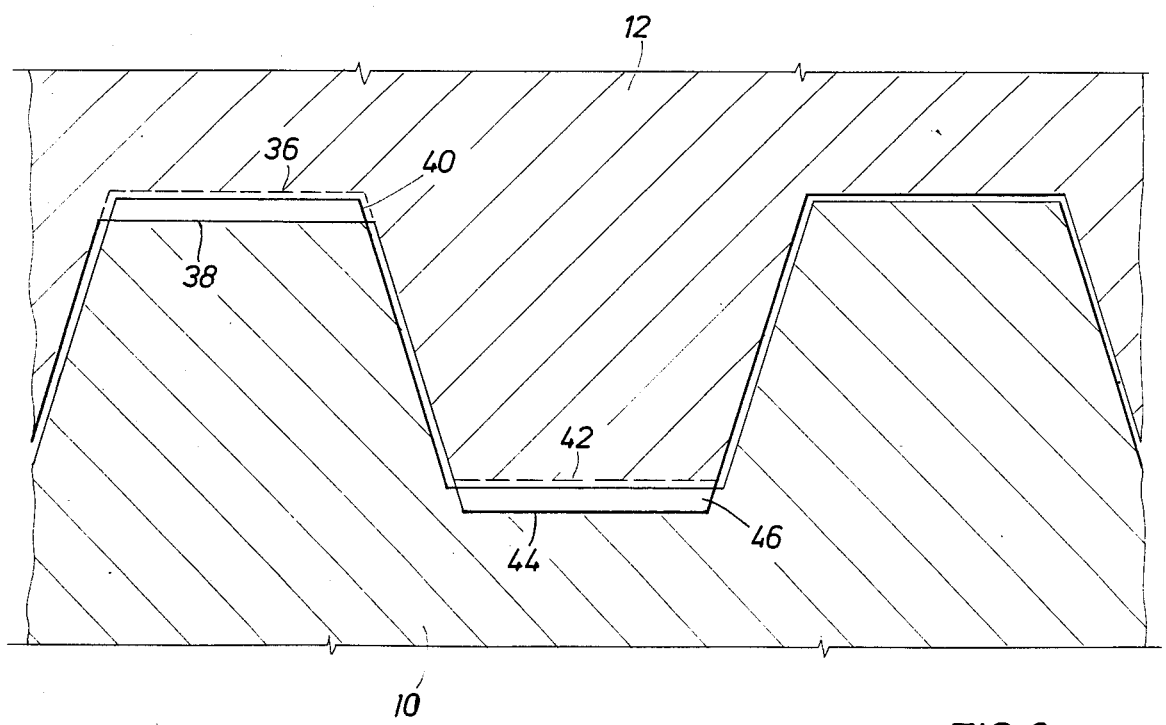
FIG. 3 is an enlarged schematic view of the contact area in interference in the connection of the present invention.

Now referring to FIG. 3, an enlarged view of what occurs is illustrated with respect to either a reduction in root dimension or an enlargement of crest dimension in order to make the radial interference contact which has previously been described. The standard root dimension of a thread in box end 12 is identified by dotted line 36, if this root dimension were made more shallow as represented by dimension 38, then a standard crest dimension in the corresponding pin end thread would cause a uniform interference over cross-sectional area 40. Actually, the box end would be expanded and the pin end would shrink in order to cause the interference to occur.

In similar fashion, increasing the dimension of the crest of a box thread from a standard dimension represented by dotted line 42 to an enlarged dimension represented by line 44 causes an interference area 46. This interference area is similar to area 40 previously discussed, which is the dimension which causes an expansion of box end 12 and a shrinkage of pin end 10 so that the interference is accommodated during makeup. It is noted that both area 40 and area 46 are uniform in cross-section dimension and are not tapered, as with the prior art. It is further noted that areas 40 and 44 are the so-called "breakband" areas that are in torque engagement when the connection is made up and which has to be torqued out of interference when the connection is disconnected.

Figure 2:
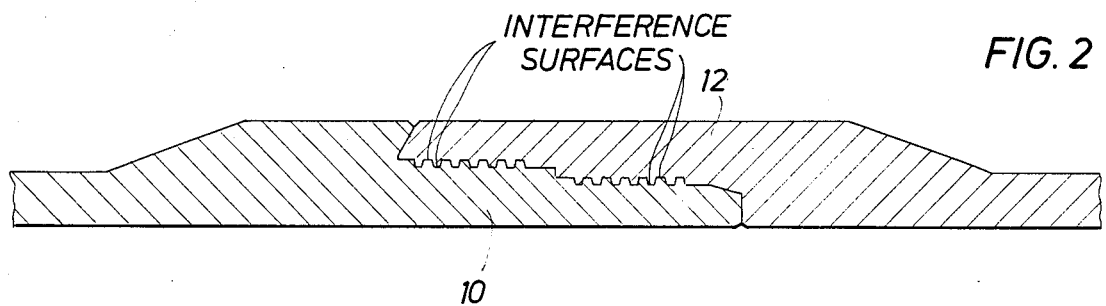
FIG. 2 is a partial side view, in section, of the connection shown in FIG. 1 following makeup.

It will be understood that the invention is not limited to the embodiments shown and discussed since many modifications may be made and will become apparent to those skilled in the art. For example, additional threads can be put into interference, if desired, to further increase the total area in torque engagement. One or two threads of thread set 14 near seal 18 or on thread set 26 near area 28 can be treated in the manner described above to obtain additional breakband contact. In fact, treating such threads by themselves, and not so treating the threads for contact at the "interference" surface contacts shown in FIGS. 1 and 2, is an acceptable alternative structure.

What is claimed is:

1. A cylindrical threaded connection comprising a pin end and a box end with threads of substantially uniform, taperless radial dimensions within the respective thread sets of said pin end and said box end and provided with free running radial clearance between the threads of said respective thread sets, said connection, having the improvement comprising uniform radial interference in at least one of the threads during the last revolution of at least one of the pin end and box end to provide an interference engagement prior to completed thread makeup as provided by an interfering thread configuration of uniform root-to-crest radial dimension.

2. A cylindrical threaded connection in accordance with claim 1, wherein at least one of said pin end and box end slightly radially varies so that the free running radial clearance reduces with each thread revolution during makeup.

3. A cylindrical threaded connection in accordance with claim 1, wherein each of said pin end and said box end is provided with a radial interference engagement within the last revolution of the threads prior to makeup.

4. A cylindrical threaded connection in accordance with claim 3, wherein said radial interference engagement occurs in the last thread of said pin end.

5. A cylindrical threaded connection in accordance with claim 4, and including additional radial interference engagement in the first thread of said pin end.

6. A cylindrical threaded connection in accordance with claim 3, wherein said radial interference engagement occurs in the first thread of said pin end.

7. A cylindrical threaded connection in accordance with claim 1, wherein each said pin end and box end includes two sets of threads with a step therebetween, there being free running radial clearance between the threads of each of said sets.

8. A cylindrical threaded connection in accordance with claim 7, wherein each of said thread sets is provided with a radial interference engagement within the last revolution of the threads prior to complete makeup.

9. A cylindrical threaded connection in accordance with claim 8, wherein said radial interference engagement occurs in the last thread of each thread set of said pin end.

10. A cylindrical threaded connection in accordance with claim 9, and including additional radial interference engagement in the first thread of each thread set of said pin end.

11. A cylindrical threaded connection in accordance with claim 8, wherein each of the thread sets on both said pin end and said box end is provided with a radial interference engagement within the last revolution of the threads prior to complete makeup.

12. A cylindrical threaded connection in accordance with claim 1, wherein said interfering thread configuration of uniform root-to-crest radial dimension is selected from a group consisting of a pin thread root of less radial dimension than said threads of substantially uniform, taperless radial dimensions of said pin end, a pin thread crest of greater radial dimension than said threads of substantially uniform, taperless radial dimensions of said pin end, a box thread root of greater radial dimension than said threads of substantially uniform, taperless radial dimensions of said box end, and a box thread crest of less radial dimension than said threads of substantially uniform, taperless radial dimensions of said box end.

* * * * *